(12) United States Patent
Goldberg et al.

(10) Patent No.: US 6,487,819 B1
(45) Date of Patent: Dec. 3, 2002

(54) MAGNETIC WEATHER STRIP

(75) Inventors: Ira B. Goldberg, Thousand Oaks, CA (US); Patricia Cunningham, Thousand Oaks, CA (US); Timothy X. Bland, Twyning (GB); Gurbinder S. Kalsi, Waverly (GB)

(73) Assignee: Meritor Light Vehicle Technology L.L.C, Troy, MI (US)

( * ) Notice: Subject to any disclaimer, the term of this patent is extended or adjusted under 35 U.S.C. 154(b) by 0 days.

(21) Appl. No.: 09/618,486

(22) Filed: Jul. 18, 2000

(51) Int. Cl.[7] ................................................. E06B 7/16
(52) U.S. Cl. ...................................... 49/478.1; 49/475.1
(58) Field of Search ............................. 49/478.1, 475.1, 49/483.1, 479.1; 277/80, 180, 184

(56) References Cited

U.S. PATENT DOCUMENTS

| | | | | |
|---|---|---|---|---|
| 3,133,324 A | * | 5/1964 | Foreman | |
| 4,561,223 A | * | 12/1985 | Gold et al. | 52/202 |
| 4,702,038 A | * | 10/1987 | Frey | 49/478 |
| 4,753,042 A | * | 6/1988 | Adkins | 49/478 |
| 5,257,791 A | * | 11/1993 | Cittadini et al. | 277/80 |
| 5,309,680 A | * | 5/1994 | Kiel | 49/478.1 |
| 5,355,628 A | * | 10/1994 | Dranchak | 49/483.1 |
| 5,367,831 A | * | 11/1994 | Gunkel | 49/478.1 |
| 5,975,664 A | * | 11/1999 | Banicevic et al. | 312/405 |
| 6,131,341 A | * | 10/2000 | Wade et al. | 49/478.1 |

* cited by examiner

Primary Examiner—Blair M. Johnson
(74) Attorney, Agent, or Firm—Suiter & Associates PC (57) ABSTRACT

A weather strip for use on a vehicle comprises an engaging portion for securing a weather strip to a vehicle and a weather strip body comprising a compressible portion and a magnetic sealing portion. The magnetic sealing portion provides a seal acting in a direction projecting toward a magnetically attractive substrate to provide a sealing interference between the magnetic sealing portion and the substrate when the weather strip is installed on the vehicle and a door closes the opening. The weather strips described herein provide an air and water tight seal without requiring a high compression force, thus improving door operation and reducing closing noise by eliminating the need to slam the door.

37 Claims, 5 Drawing Sheets

MAGNETIC WEATHER STRIP

FIELD OF THE INVENTION

The present invention relates generally to weather stripping for motor vehicles and more particularly to weather stripping having a magnetic sealing surface.

BACKGROUND OF THE INVENTION

Numerous types of weather stripping have been provided in the prior art that are adapted to seal spaces between objects. Weather stripping on automobiles needs to be tightly compressed to eliminate leakage, e.g., due to rain or washing, and to minimize noise due to air entering the vehicle through small gaps. To obtain a sufficient degree of compression, a high degree of force is generally needed to close the automobile door. This results in a high slamming force for closing as well as a high force for opening due to friction on the latching system. It would therefore be desirable to provide improved weather stripping to improve the ergonomics of vehicle door operation by reducing the force needed for opening and closing vehicle doors.

SUMMARY OF THE INVENTION

It is an object of the present invention to provide a weather strip that provides a sealing engagement between an opening in a vehicle and a vehicle door, or other closing member, and that reduces the force needed for opening and closing the door. By reducing the force needed to close the door, the need to slam the door is eliminated and closing noise is reduced.

The present invention provides a weather strip for use on a vehicle comprising an engaging portion for engaging a portion of the vehicle defined peripherally about an opening provided on the vehicle and a weather strip body comprising a compressible portion and a magnetic sealing portion. The magnetic sealing portion provides a seal acting in a direction projecting toward a member operatively attached to the vehicle for closing the opening, wherein the magnetic sealing portion and the closing member are magnetically attractive so as to provide a sealing interference between the magnetic sealing portion and the closing member when the weather strip is installed on the vehicle and the closing member closes the opening.

In a further aspect, the present invention provides a weather strip for use on a vehicle comprising an engaging portion for engaging a closing member, the closing member operatively attached to the vehicle for closing an opening provided on the vehicle opening, and a weather strip body comprising a compressible portion and a magnetic sealing portion. The magnetic sealing portion provides a seal acting in a direction projecting toward a portion of the vehicle defined peripherally about the opening, wherein the magnetic sealing portion and the portion of the vehicle defined peripherally about the opening are magnetically attractive so as to provide a sealing interference between the magnetic sealing portion and the portion of the vehicle defined peripherally about the opening when the weather strip is installed on the vehicle and the closing member closes the opening.

The magnetically attraction between the sealing surfaces provides an airtight and watertight seal without requiring a high compression force, thus allowing the use of a weather strip that is more readily compressible than conventional vehicle weather strips. Accordingly, the weather strip may thus be produced to have an ease of compressibility so as to eliminate the need to slam the door. Furthermore, reducing the compression force reduces the force needed to operate door latches or other actuators and also allows smaller door latches or actuators to be employed in the manufacture of the vehicle.

In still a further aspect, the present invention provides a method for providing a sealing engagement employing the magnetic weather strip according to the present invention.

It is to be understood that both the foregoing general description and the following detailed description are exemplary and explanatory only and are not restrictive of the invention as claimed. The accompanying drawings, which are incorporated in and constitute a part of the specification, illustrate presently preferred embodiments of the invention and together with the general description, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1:
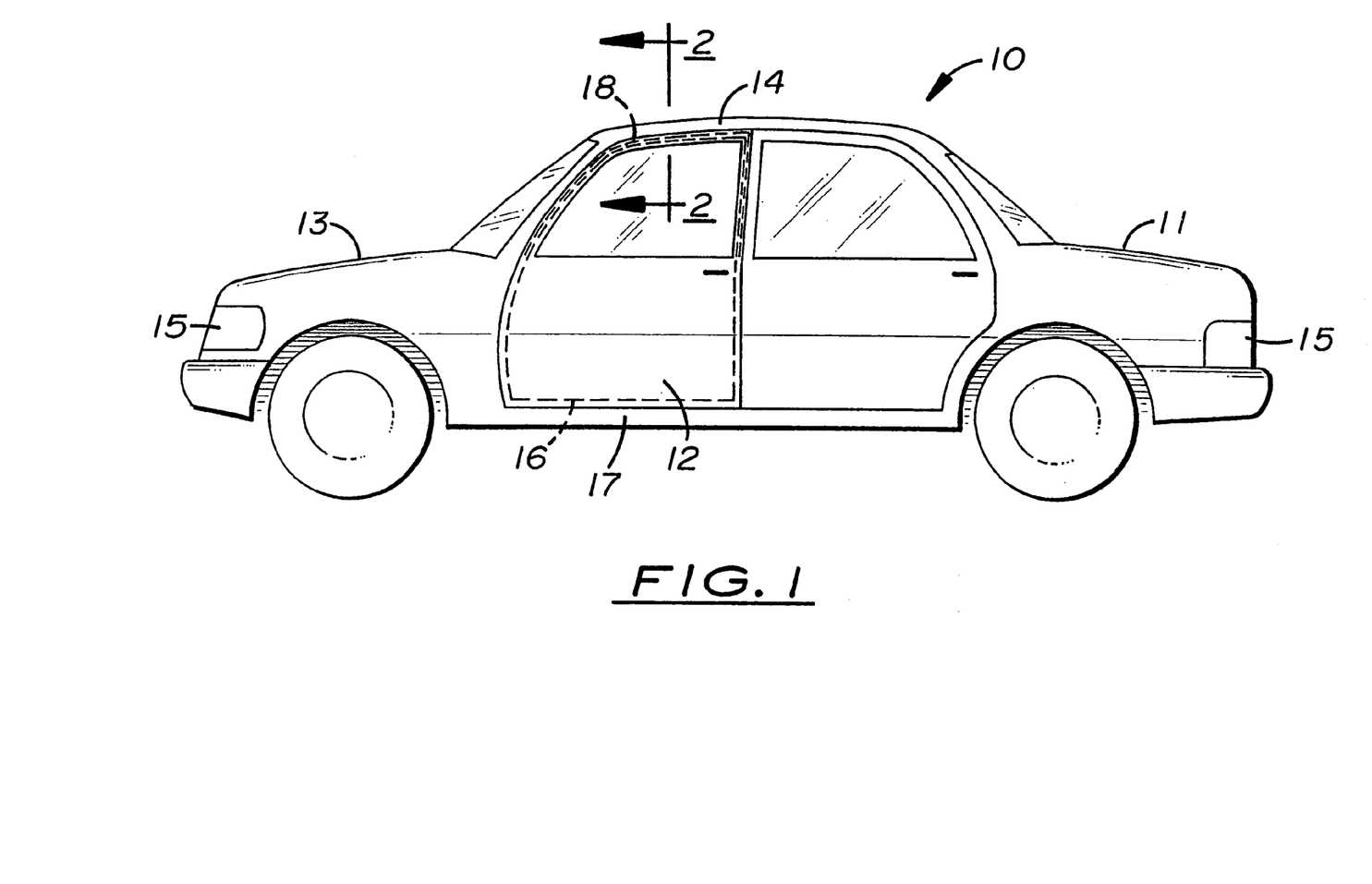
FIG. 1 is a side view of a motor vehicle to which a weather strip of the present invention is affixed.

Referring now to FIG. 1, weather stripping is used at a number of places on a motor vehicle, indicated generally by reference numeral 10, for example between a door 12 closing an opening on the vehicle and the vehicle body 14. In the specific embodiment shown in FIG. 1, weatherstrip 16 seals the entire periphery of the door opening bounded by vehicle body 14. A second, optional, weather strip 18 is also shown, which provides additional sealing on the upper portion of the door opening. Additional weather stripping (not shown) may also be provided, for example, between the door 12 and rocker panel 17. Although the present invention is described herein primarily by way of reference to a door 12 closing an opening to the passenger compartment of vehicle 10, it will be recognized that the weather stripping in accordance with this teaching may be employed with all manner of overland vehicles, aircraft, water craft, and the like, having an opening thereon wherein it is desired to prevent penetration of wind, moisture, other environmental contamination into an interior compartment thereof, such as trunk opening 11, hood opening 13, and lamp housings 15. In additional embodiments, the weather stripping according to the present invention may also be used to seal sliding doors, rear doors or tailgates, convertible tops, removable tops, roof openings such as sunroof openings, fuel filler doors, and the like.

Figure 2:
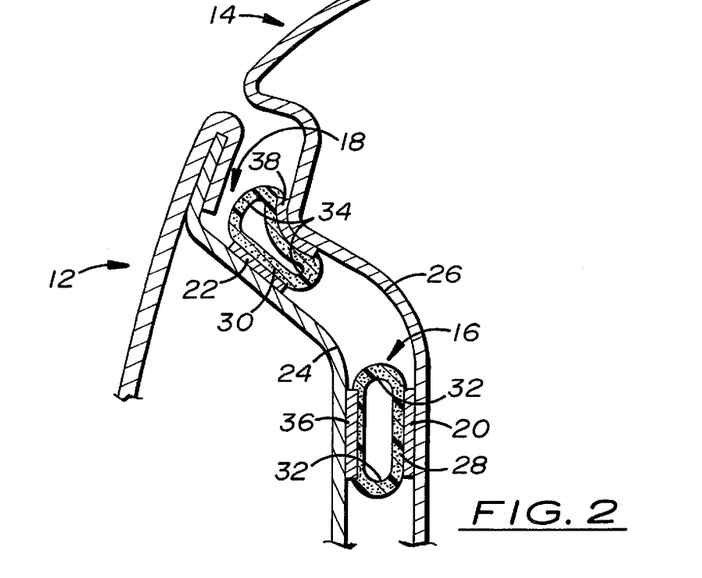
FIG. 2 is a cross-sectional view of weather strips according to the present invention taken along line 2—2 in FIG. 1.

Referring now to FIG. 2, there is shown a cross-sectional view of an exemplary arrangement of two weather strips in accordance with the present invention, designated generally as 16 and 18, taken along the line 2—2 shown in FIG. 1. Weather strip 16 is located around the periphery of an opening in vehicle body 14. In the embodiment shown, an engaging portion 28 of weather strip 16 is attached to the vehicle body 14 with double-sided adhesive tape or other adhesive material 20. Weather strip 16 faces inner edge 24 of door panel 12 with which it interacts. Also, an engaging portion 30 of optional weather strip 18 is attached with double-sided adhesive tape or other adhesive material 22 to inner edge 24 of door 12. Weather strip 18 faces inwardly toward facing surface 26 of vehicle body 14 with which it interacts.

Weather strip 16 comprises a compressible portion 32 and a magnetic sealing portion 36 which interacts with surface 24 when door 12 is in its closed position. Likewise, optional weather strip 18 comprises a compressible portion 34 and a magnetic sealing portion 38 which interacts with surface 26 when door 12 is in its closed position. Compressible portions 32 and 34 of weather strips 16 and 18, respectively, may comprise any flexible, compressible, and/or resilient material, such as flexible plastic or rubber, silicone, foam rubber, synthetic foam material, gels, and the like. Magnetic sealing portions 36 and 38 comprise a flexible, magnetic material, and preferably comprise a magnetic composite material comprising a flexible matrix or binder such as a flexible polymer material having magnetically hard particles dispersed therein.

The hard magnetic material may be any powdered or particulate materials capable of being permanently magnetically oriented as are generally known in the art. Exemplary permanent magnet particles include the rare earth metal alloy type materials, such as samarium-cobalt alloy particles, neodymium-iron-boron alloy particles, and the like. Other types of metal or metal-alloy permanent magnet particles may also be used, including Alnico (aluminum-nickel-cobalt-iron alloy), iron, iron-carbon, iron-cobalt, iron-cobalt-chromium, iron-cobalt-molybdenum, ironcobalt-vanadium, copper-nickel-iron, manganese-bismuth, manganese-aluminum, and cobalt-platinum alloys. Other magnetic materials are of the class of stable magnetic oxide materials known as the magnetic ferrites (including hexaferrites and cubic ferrites) such as barium ferrite, strontium ferrite, lead ferrite, or mixtures thereof, and which may be modified by partial substitution of the iron by many other elements such as cobalt. Other examples include magnetite ($Fe_3O_4$), maghemite ($\gamma$-$Fe_2O_3$), intermediates of magnetite and maghemite, and cobalt-substituted modifications of magnetite, maghemite, and their intermediates. Chromium dioxide is another material which may be useful as a magnetic particle in the present invention. Magnetic composites can be made with a variety of polymeric matrix components. The magnetic particles are dispersed within the composite at a loading sufficient to attain an efficient magnetic attraction of the weather strip for the magnetically attractive substrate.

Magnetic sealing portions 36 and 38 may be integrally formed with the compressible portions 32 and 34, respectively, or, alternatively, may be separately formed and attached thereto. In the embodiment shown, the vehicle door 12 and vehicle body 14 are steel and thus magnetically attractive. In an embodiment (not shown), where the door or vehicle body (or the portion that accepts the seal) is not steel or other magnetically attractive material, a steel strip or other magnetically soft or magnetically attractive material such as a magnetically attractive composite material may be attached thereto. In certain embodiments, the magnetically attractive material is a soft magnetic composite comprising a polymeric matrix having magnetically soft particles or powder dispersed therein. In another embodiment (not shown), optional weather strip 18 may be a conventional nonmagnetic weather strip. Likewise, in yet another embodiment, optional weather strip 18 may be a magnetic weather strip in accordance with this teaching and weather strip 16 may be a conventional nonmagnetic weather strip.

Figure 3:
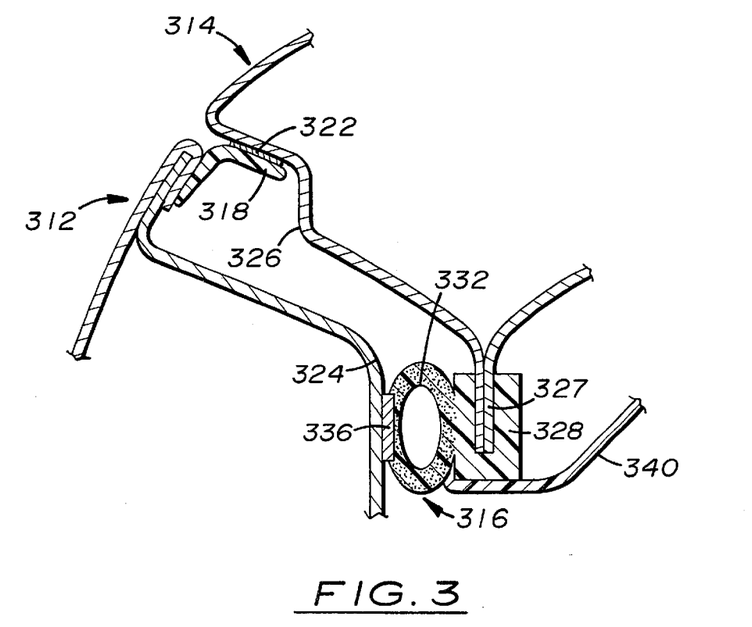
FIG. 3 is a cross-sectional view of an alternative embodiment of the present invention.

Referring now to FIG. 3, there is shown a cross-sectional view of another exemplary embodiment of the present invention. Weather strip 316 is located around the periphery of an opening in vehicle body 314. Weather strip 316 comprises an engaging portion 328 having a generally U-shaped cross-sectional shape which engages body panel flange 327. Weather strip 316 may also be retained, for example, by body molding 340, which may retain weather strip 316 in a bezel-type arrangement. Weather strip 316 faces inner edge 324 of door panel 312 with which it interacts. In the embodiment depicted, optional weather strip 318 is depicted as a conventional weather strip having a generally L-shaped cross-sectional shape attached to inner edge 326 of body 314 with double-sided adhesive tape or other adhesive material 322 and engages inner surface 324 of door 312. Optional weather strip 318 need not circumscribe the entire door opening, but may be employed at significant locations such as on upper portions of the vehicle door opening, between the door and rocker panel, and so forth. In an alternative embodiment (not shown) optional weather strip 318 may be adapted to provide a magnetic weather strip in accordance with this teaching by providing a magnetic sealing surface thereon.

Weather strip 316 further comprises a compressible portion 332 integrally formed with engaging portion 328 and a magnetic sealing portion 336 which interacts with surface 324 when door 312 is in its closed position. Compressible portion 332 of weather strip 316 may comprise any resilient material, such as flexible plastic or rubber, silicone, foam rubber, synthetic foam material, gels, and the like, as described above. Magnetic sealing portion 336 is a flexible, magnetically hard material, and is preferably a magnetic composite material comprising a flexible polymer having permanent magnetic materials dispersed therein. Magnetic sealing portion 336 may be integrally formed with the compressible portion 332 or, alternatively, may be separately formed and attached thereto.

In alternative embodiments, not shown, the engaging portion of the weather strips according to the present invention may be fastened to a vehicle or vehicle door via a number of alternative methods, including, for example, chemical adhesives, a plurality of clips, screws, dogs, pawls, wire legs, and so forth spaced along the length of the weather strip, or the weather strip may have a flange formed thereon which may be retained via a tongue and groove arrangement or by a bezel which may be a fixture or molding such as a roof, door, or body molding, or other body feature. Also, a combination of adhesive and mechanical fasteners may also be employed.

Figure 4:
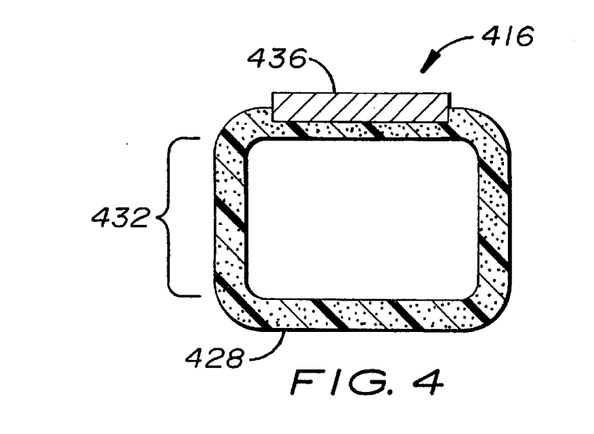
FIGS. 4–7 are cross-sectional views of several weather strips according to various embodiments of the present invention.

Referring now to FIG. 4, there is shown in greater detail a weather strip 416 in accordance with a basic embodiment of the present invention. Weather strip 416 comprises an attachment portion 428 for attachment to a vehicle body or vehicle door, a compressible portion 432 comprising flexible walls, and a magnetic sealing portion 436. Magnetic portion 436 may be prepared by dispersing magnetically hard particles into a flexible polymer. Again, the magnetic sealing portion and compressible portion may be separately formed and attached, or may be integrally formed.

Figure 5:
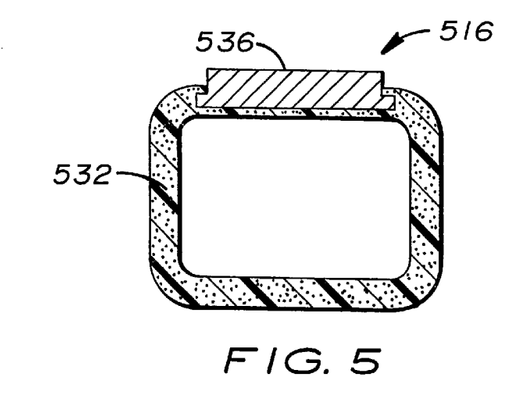
Figure 6:
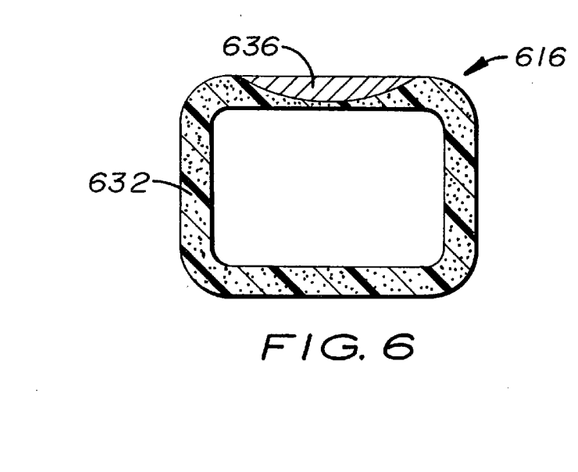

FIG. 5 illustrates a weather strip 516 according to the present invention similar to that shown in FIG. 4, but wherein the magnetic sealing portion 536 is attached to compressible portion 632 by a tongue and groove arrangement. FIG. 6 illustrates a weather strip 616 according to the present invention wherein magnetic sealing portion 636 is integrally formed, e.g., via comolding, coextrusion, or other similar process, with compressible portion 632.

Figure 7:
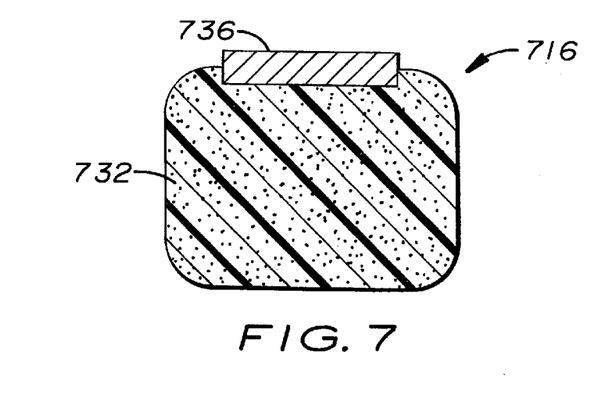

Although the compressible portion of the weather strips in accordance with the present invention are primarily depicted herein as being hollow or tubular, in further embodiments, the compressible portion may comprise any compressible or resilient material. For example, FIG. 7 illustrates a weather strip 716 according to the present invention wherein magnetic portion 736 is attached to compressible portion 732 comprising a nontubular material such as a foam or other resilient or compressible material. In alternative embodiments (not shown) wherein a tubular compressible portion is employed, the tubular portion may contain one or more partitions, e.g., parallel to the axis of the weather strip. In still further embodiments, the cross-sectional shape of the weather strip according to the present invention may be modified to accommodate the surfaces to be sealed, for example, by varying the angles of the surfaces of the weather strip, incorporating one or more accordion folds into the compressible portion, and so forth.

Figure 8:
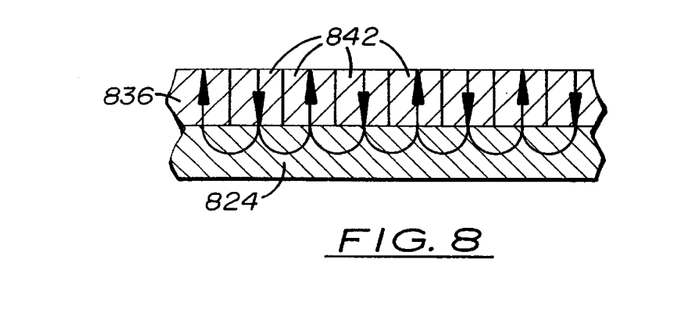
FIGS. 8–11 illustrate a sealing engagement between the magnetic weather strip according to the present invention and a magnetically attractive substrate wherein stripes of alternating polarity are employed.
Figure 9:
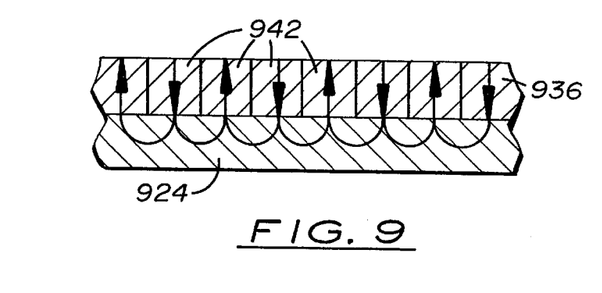

Referring now to FIG. 8, a sectional view of an engagement between magnetic seal 836 and steel substrate 824 is shown. The magnetic attraction between substrate 824 and magnetic sealing portion 836 of weather strip 816 is increased by permanently magnetizing the magnetic composite forming the magnetic sealing surface 836 in a plurality of stripes 842 of alternating north-south polarity with the poles reversed in each adjacent stripe. This permits continuous magnetic flux through the steel substrate 824 and provides a stronger attraction than if the magnetic material of portion 836 were uniformly magnetized. Similarly, FIG. 9 illustrates a cross-sectional view of the sealing engagement between magnetic sealing surface 936, magnetized in stripes 942 of alternating polarity, and a substrate 924 comprising a magnetically attractive composite material.

By employing stripes of alternating polarity, the magnetic attraction between the magnetic sealing portion and the magnetically attractive substrate is not only strengthened, but the distance over which the magnetic attraction ranges is decreased, thus eliminating the magnetic attraction between the weather strip according to the present invention and the door once the door is opened beyond a short distance from the weather strip, and also minimizing the attraction between foreign objects and the magnetic weather strip. The stripes of alternating polarity may be arranged in any direction along the plane formed by the surface of the magnetic sealing portion. In one embodiment, the stripes of alternating polarity are oriented along the surface of the magnetic sealing portion in a direction orthogonal to the axial direction of the weather strip. In another embodiment, the stripes of alternating polarity are oriented along the surface of the magnetic sealing portion in a direction diagonal with respect to the axial direction of the weather strip. The strips may be any desired width, and are preferably about 1/2 inch in width or less.

Figure 10:
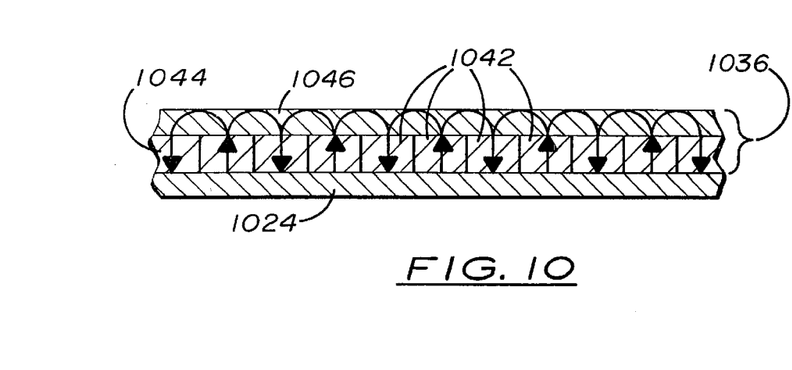
Figure 11:
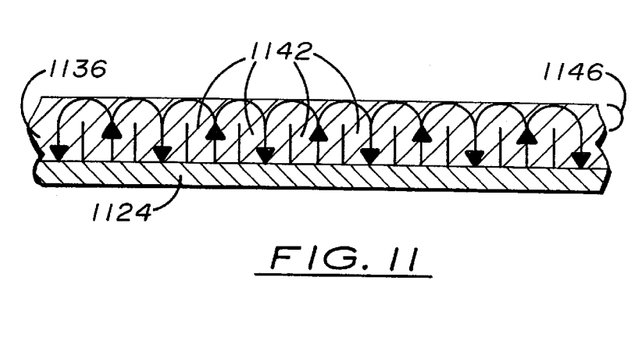

Referring now to FIG. 10, there is shown a sectional view of an engagement between magnetic seal 1036 and steel substrate 1024. Magnetic seal 1036 comprises stripes of alternating polarity 1042 as described by way of reference to FIGS. 8 and 9, but with an additional magnetically attractive layer 1046 overlying the stripes of alternating polarity 1042. Layer 1046 may be, for example, a magnetically soft composite or other magnetically soft material. In this manner, the magnetization curves around the top so that the magnetic sealing surface behaves as a series of horseshoe magnets. Similarly, FIG. 11 depicts a sectional view of an engagement between magnetic seal 1136 and steel substrate 1124 that is similar to that shown in FIG. 10, wherein magnetic seal 1136 is magnetized in a pattern of stripes 1142 of alternating north-south polarity that do not traverse the thickness of the seal 1136. In this manner, magnetic seal 1136 comprises an integrally formed nonmagnetized layer 1146 overlying the stripes of alternating polarity 1042, causing the seal 1136 to behave as a series of horseshoe magnets.

Figure 12:
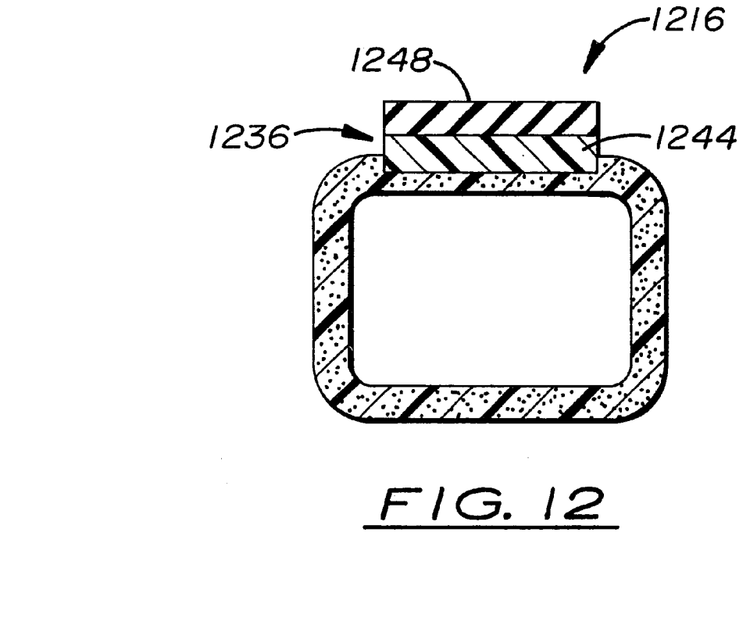
FIGS. 12 and 13 are cross-sectional views of additional embodiments of the present invention wherein the magnetic material of the weather strip does not directly contact the substrate.

In each of the above described embodiments, the magnetic sealing portion of the weather strip according to the present invention forms a sealing engagement by direct contact between a magnetic material and an opposing magnetically attractive surface. As such, the ability to form a tight seal depends on the flexibility of the magnetic sealing surface. It will be recognized that the magnetic composite material forming the magnetic sealing portion may be made more flexible by decreasing the concentration of magnetic material in the composite, however, the strength of magnetic attraction/adhesion will also decrease. FIG. 12 illustrates a weather strip 1216 according to the present invention wherein magnetic sealing portion 1236 comprises a magnetic layer 1244 and a flexible contact layer 1248. Flexible contact layer 1248 may be any flexible, resilient, or compressible material, such as flexible plastic or rubber, foam rubber, synthetic foam material, gels, and the like, and is disposed between the magnetic layer 1244 and a sealingly engaged surface. In this manner, magnetic layer 1244 may have a sufficient concentration of magnetically hard materials dispersed therein to achieve a desired strength magnetic attraction, with flexible contact layer 1248 providing the necessary flexibility. In one embodiment, the flexible contact layer does not contain any magnetic or magnetically attractive materials dispersed therein. In another embodiment, the flexible contact layer may be a flexible composite material having a magnetically attractive material dispersed therein. In still another embodiment, the flexible contact layer may be a flexible composite material having a magnetically hard material dispersed therein, e.g., at a lower concentration than magnetic layer 1244. In an embodiment not shown, a high strength magnetic sealing portion may be achieved, while retaining flexibility at the contact surface, by employing a magnetic sealing portion comprising a magnetically hard composite material wherein the concentration of magnetically hard materials in the composite is increased near the base of the magnetic sealing portion and is decreased near the contact surface to provide flexibility, e.g., wherein a plurality of discrete concentration levels are provided, or alternatively, wherein a graduated concentration is provided. Any of the embodiments shown and described herein of the magnetic weather strip of the present invention may be modified to employ the flexible contact layer in accordance with this teaching.

Figure 13:
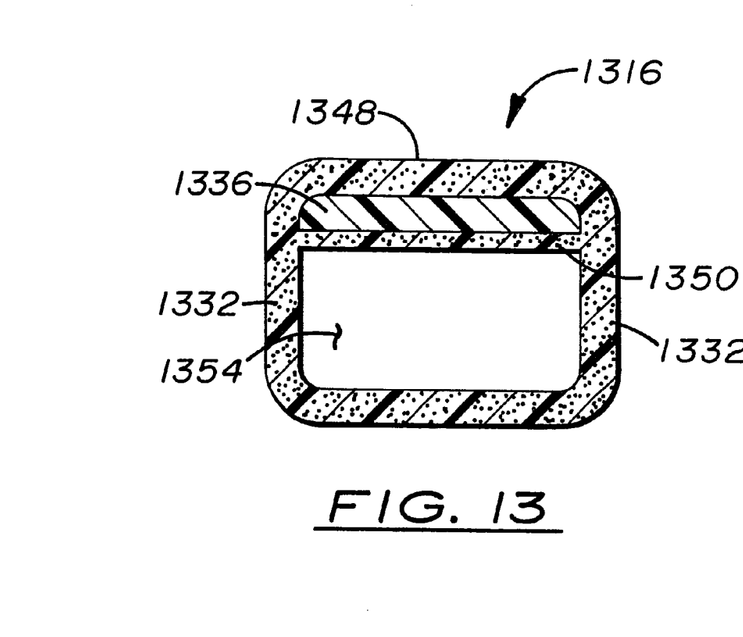

Referring now to FIG. 13, there is shown a magnetic weather strip 1316 in accordance with the present invention having a generally tubular or hollow cross-section and having a sleeve retaining magnetic seal 1336 within the interior of weather strip 1316 and a foam or hollow interior 1354. The sleeve retaining magnetic portion 1336 is bounded by interior partition 1350 and upper surface 1348.

Upper surface 1348 provides a flexible contact surface for engaging a magnetically attractive substrate on a vehicle. In an embodiment not shown partition 1350 may be omitted and magnetic seal 1336 may be retained in the interior of weather strip 1316 by an adhesive or other fastening means. Likewise, in a further embodiment, not shown, partition 1350 may be omitted and the hollow portion of weather strip 1316 may be sized to securely accommodate magnetic portion 1336. In still another embodiment, not shown, partition 1350 may be omitted and magnetic portion 1336 retained in place with a compressible material, e.g., a foam material, occupying the remainder the interior of weather strip 1316.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A weather strip for use on a vehicle comprising:
    an engaging portion for engaging a portion of the vehicle defined peripherally about an opening provided on the vehicle; and
    a weather strip body comprising a compressible portion and a magnetic sealing portion, said magnetic sealing portion including a plurality of alternating north-south pole stripes with the poles reversed in each adjacent stripe and a layer of magnetic material disposed between stripes of alternating polarity and said compressible portion, said magnetic sealing portion for providing a seal acting in a direction projecting toward a closing member operatively attached to the vehicle for closing the opening, wherein said magnetic sealing portion and said closing member are magnetically attractive so as to provide a sealing interference between the magnetic sealing portion and the closing member when the weather strip is installed on the vehicle and the closing member closes the opening.

2. A weather strip according to claim 1, wherein said weather strip completely circumscribes said vehicle opening when said weather strip is installed on said vehicle.

3. A weather strip according to claim 1, wherein said weather strip does not completely circumscribe said vehicle opening when said weather strip is installed on said vehicle.

4. A weather strip according to claim 1, wherein said magnetic sealing portion comprises a flexible polymer having a magnetically hard material incorporated therein.

5. A weather strip according to claim 4, wherein said magnetically hard material is selected from the group consisting of barium ferrite, strontium ferrite, and neodymium-iron-boron.

6. A weather strip according to claim 1, wherein said layer of magnetic material is a layer of soft magnetic material.

7. A weather strip according to claim 1, wherein said layer of magnetic material is a layer of nonmagnetized material having magnetically hard material, dispersed therein.

8. A weather strip according to claim 7, wherein said nonmagnetized magnetically hard material and said stripes of alternating polarity are integrally formed.

9. A weatherstrip according to claim 1, wherein said stripes of alternating magnetic polarity are about one-half of an inch or less in width.

10. A weather strip according to claim 1, wherein said stripes of alternating magnetic polarity are about one-fourth of an inch or less in width.

11. A weather strip according to claim 1, wherein said stripes of alternating magnetic polarity are about one-eighth of an inch or less in width.

12. A weather strip according to claim 1, wherein said magnetic sealing portion and said compressible portion are integrally formed.

13. A weather strip according to claim 1, wherein said compressible portion comprises a tubular cross-sectional configuration comprising opposing flexible walls.

14. A weather strip according to claim 1, wherein said compressible portion comprises a compressible foam material.

15. A weather strip according to claim 1, wherein said magnetic sealing portion comprises a magnetic layer and a flexible contact layer, wherein said flexible contact layer is disposed between said magnetic layer and said closing member when the weather strip is installed on the vehicle and the closing member closes the opening.

16. A weather strip according to claim 1, wherein said magnetic sealing portion is retained within an interior portion of said weather strip body.

17. A weatherstrip according to claim 16, wherein said weatherstrip body is generally tubular in cross section and wherein said magnetic sealing portion is retained within a sleeve formed within said weather strip body.

18. A weather strip for use on a vehicle, comprising:
    an engaging portion for engaging a closing member, said closing member operatively attached to the vehicle for closing an opening provided on the vehicle opening; and
    a weather strip body comprising a compressible portion and a magnetic sealing portion, said magnetic sealing portion including a plurality of alternating north-south pole stripes with the poles reversed in each adjacent stripe and a layer of magnetic material disposed between said stripes of alternating polarity and said compressible portion said magnetic sealing portion for providing a seal acting in a direction projecting toward a portion of the vehicle defined peripherally about said opening, wherein said magnetic sealing portion and said portion of the vehicle defined peripherally about said opening are magnetically attractive so as to provide a sealing interference between the magnetic sealing portion and the portion of the vehicle defined peripherally about said opening when the weather strip is installed on the vehicle and the closing member closes the opening.

19. A weather strip according to claim 18, wherein said weather strip completely circumscribes said vehicle opening when said weather strip is installed on said vehicle and the closing member closes the opening.

20. A weather strip according to claim 18, wherein said weather strip does not completely circumscribe said vehicle opening when said weather strip is installed on said vehicle and the closing member closes the opening.

21. A weather strip according to claim 18, wherein said magnetic sealing portion comprises a flexible polymer having a magnetically hard material incorporated therein.

22. A weather strip according to claim 21, wherein said magnetically hard material is selected from the group consisting of barium ferrite, strontium ferrite, and neodymium-iron-boron.

23. A weather strip according to claim 18, wherein said layer of magnetic material is a layer of soft magnetic material, dispersed therein.

24. A weather strip according strip according to claim 18, wherein said layer of magnetic material is a nonmagnetized, material having magnetically hard material.

25. A weather strip according to claim 24, wherein said nonmagnetized magnetically hard material and said stripes of alternating polarity are integrally formed.

26. A weather strip according to claim 18, wherein said stripes of alternating magnetic polarity are about one-half of an inch or less in width.

27. A weather strip according to claim 18, wherein said stripes of alternating magnetic polarity are about one-fourth of an inch or less in width.

28. A weather strip according to claim 18, wherein said stripes of alternating magnetic polarity are about one-eighth of an inch or less in width.

29. A weather strip according to claim 18, wherein said magnetic sealing portion and said compressible portion are integrally formed.

30. A weather strip according to claim 18, wherein said compressible portion comprises a tubular cross-sectional configuration comprising opposing flexible walls.

31. A weather strip according to claim 18, wherein said compressible portion comprises a compressible foam material.

32. A weather strip according to claim 18, wherein said magnetic sealing portion comprises a magnetic layer and a flexible contact layer, wherein said flexible contact layer is disposed between said magnetic layer and said portion of the vehicle defined peripherally about said opening when the weather strip is installed on the vehicle and the closing member closes the opening.

33. A weather strip according to claim 18, wherein said magnetic sealing portion is retained within an interior portion of said weather strip body.

34. A weatherstrip according to claim 33, wherein said weatherstrip body is generally tubular in cross section and wherein said magnetic sealing portion is retained within a sleeve formed within said weather strip body.

35. A method for sealing an opening on a vehicle, comprising:

installing a weather strip so that it is positioned between a portion of the vehicle defined peripherally about said opening and a member operatively attached to the vehicle for closing the opening when said member closes said opening, said weather strip comprising:
- an engaging portion for engaging one of said portion of the vehicle defined peripherally about the opening and said closing member, and
- a weather strip body comprising a compressible portion and a magnetic sealing portion, said magnetic sealing portion including a plurality of alternating north-south pole stripes with the poles reversed in each adjacent stripe and a layer of magnetic material disposed between said stripes of alternating polarity and said compressible portion, said magnetic sealing portion for providing a seal acting in a direction projecting toward the other of said portion of the vehicle defined periphery about the opening and said closing member, wherein said magnetic sealing portion and the other of said portion of the vehicle defined peripherally about an opening provided on the vehicle and said closing member are magnetically attractive so as to provide a sealing interference when the weather strip is installed on the vehicle and the closing member closes tile opening; and closing said opening with said closing member.

36. A method according to claim 35, wherein said engaging portion engages said portion of the vehicle defined peripherally about the opening.

37. A method according to claim 35, wherein said engaging portion engages said closing member.

* * * * *